United States Patent Office 3,185,701
Patented May 25, 1965

3,185,701
PREPARATION OF WATER-SOLUBLE PHTHALOCYANINE SULFONAMIDE DYESTUFFS
Marco Tessandori, Milan, and Aldo Pasquarelli, Seveso, Milan, Italy, assignors to Aziende Colori Nazionali Affini ACNA S.p.A., Milan, Italy
No Drawing. Filed Feb. 25, 1963, Ser. No. 260,828
Claims priority, application Italy, Feb. 27, 1962, 3,978/62
1 Claim. (Cl. 260—314.5)

The present invention relates to water-soluble phthalocyanine dyestuffs which are particularly suitable for direct dyeing on vegetable fibers, particularly cotton. The present invention also relates to a method of preparing such dyestuffs.

Products obtained by reacting phthalocyanine-sulfonylchlorides with amines are known. More particularly, German Patent 696,591, describes the reaction between phthalocyanine-tetrasulfonylchlorides and cyclohexylamine; the sulfonamides thus obtained, wherein all the $-SO_2Cl$ groups are transformed into $-SO_2NHC_6H_{11}$, are all insoluble in water.

Phthalocyanine compounds exhibiting a degree of solubility in water are also known. These have been obtained by reacting directly a phthalocyanine-sulfonylchloride with an aliphatic or aromatic amine so that a substitution of only a part of the $-SO_2Cl$ groups present takes place, and the other groups are then hydrolyzed to sulfonic groups by boiling, for instance, with water.

We have now surprisingly found that a phthalocyanine-tri-sulfonamide or a phthalocyanine-tetra-sulfonamide can be made to undergo a partial hydrolysis by treatment with concentrated $H_2SO_4$ phthalocyanine dyestuffs can be obtained whose properties do not depend in large extent on the conditions of the hydrolysis. The analysis allows to calculate for these dyestuffs a general formula of the type (1)

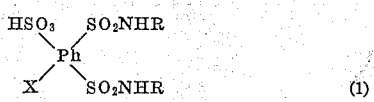

wherein Ph is the residue of copper phthalocyanine of the type

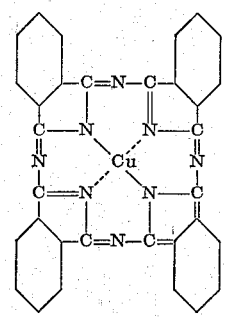

X is either $-SO_3H$ or H, and R is a hydrogen radical selected from the group consisting of cyclohexyl, phenyl and tolyl.

The present invention also provides a process for the preparation of the above-mentioned water soluble phthalocyanine dyestuffs.

This process comprises treating a compound of the formula:

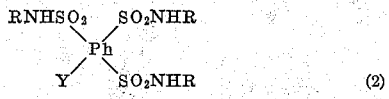

wherein Y is H or the radical $-SO_2NHR$ and wherein Ph and R have the previously mentioned meanings with concentrated $H_2SO_4$ at a temperature of about 30° C., followed by pouring into water, salting and filtration, to thereby effect a partial hydrolysis. The advantage of this method for the preparing of water soluble phthalocyanine dyestuffs resides in the fact that one can regulate the degree of hydrolysis, in that the finished dyestuff retains a definite number of sulfamido groups. This fact insures a greater uniformity of properties.

The two sulfamido groups also result in a higher water solubility of the product also if the experimental conditions are widely changed: for instance the temperature may vary from 25 to 65° C., the time of hydrolysis from 2 to 20 hours, the concentration of sulphuric acid from 94 to 100 percent.

The compounds of the Formula 2 may be prepared according to the known art. Such compounds can, for instance, be obtained by reacting one mole of copper phthalocyanine with 3 moles (when Y is H) or with 4 moles (when Y is $SO_2NHR$) of chlorosulfonic acid and treating the product thus obtained with 3 or 4 moles of an amine $RNH_2$ wherein R is cyclohexyl, phenyl or tolyl.

It is preferable to complete the sulfochlorination reaction with addition of $PCl_5$ or thionyl chloride.

The water soluble phthalocyanine dyestuffs comprised in the Formula 1, and particularly, the dyestuff having the formula:

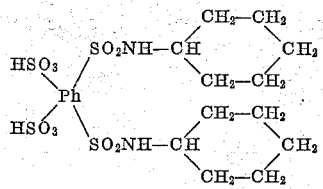

have characteristics of improved affinity, purity and fastness as compared to the previously known phthalocyanine dyestuffs.

The following examples will further illustrate the invention. All parts are by weight unless otherwise indicated.

*Example 1*

4 g. phthalocyanine-tetra-sulfocyclohexylamide which may be represented by the formula:

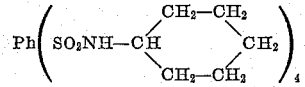

are dissolved at 30° C. in 72 g. 98.5% $H_2SO_4$.

After two hours under agitation, the mixture is discharged into 350 ml. cold water while the temperature is maintained at 20° C. or lower. The mass is salted with 20 g. NaCl, is agitated to complete the precipitation of the disulfonamido product, and is filtered and washed with a 10% solution of NaCl in water.

The yield of the transformation is practically the theoretical one. The product is represented by the formula:

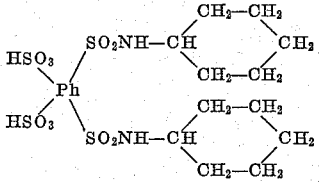

The dyestuff thus obtained dyes cotton to a blue turquoise shade which is very intense, pure, and which is resistant to wetness and to creasing.

*Example 2*

4 g. copper phthalocyanine are dissolved into 72 g.

sulfuryl hydrochloride, $SO_2HCl$, and the whole is heated at 140° C. for 4 hours. The reaction is completed by addition of 8 g. $PCl_5$ at 80° C. The mixture is cooled, poured into cold water, and filtered in the cold. The mass is treated again with water at 2–3 C. in the presence of 12 g. $Na_2CO_3$ and successively 36 g. cyclohexylamine are added.

The whole is agitated at 20° C. until the condensation is complete.

The phthalocyanine-tetra-sulfocyclohexylamine thus obtained, after drying, is treated as described in Example 1. Equivalent results are obtained.

*Example 3*

In the preparation of the sulfochloride, thionyl chloride is used instead of $PCl_5$. Otherwise the procedure is as described in Example 2. The results obtained are equivalent.

*Example 4*

4 g. copper phthalocyanine are dissolved into 72 g. chlorosulphuric acid and the whole is heated at 120–140° C. for 2–6 hours.

The cooled mass, poured in frozen water, is filtered in cold.

The mass is treated again with water at 2–3° C. in the presence of 3 g. sodium carbonate and then 5.5 g. cyclohexylamine are added.

Then the whole is agitated at 20° C. until the condensation is complete.

The product so obtained, after drying is treated with sulphuric acid as described in Example 1.

A dyestuff is obtained which dyes the cotton with a blue, intense, fast shade.

The elementary analysis allows to calculate the following formula:

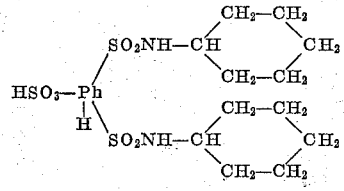

Variations can, of course, be made without departing from the spirit of the invention.

Having thus described the invention what it is desired to secure and claim by Letters Patent is:

A process for the preparation of a phthalocyanine dyestuff of the formula:

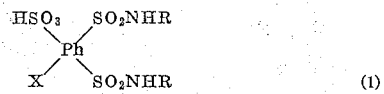

said process comprising partially hydrolyzing a compound of the formula:

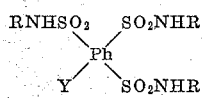

wherein Ph is the residue from copper phthalocyanine, R is selected from the group consisting of cyclohexyl, phenyl and tolyl, and Y is selected from the group consisting of $-SO_2NHR$ and H, by treating said compound with concentrated $H_2SO_4$ at a temperature of about 30° C., treating the resultant compound, which contains two $-SO_2NHR$ groups, with water and then precipitating by salting.

References Cited by the Examiner

UNITED STATES PATENTS

| | | | |
|---|---|---|---|
| 2,285,359 | 6/42 | Rosch et al. | 260—314.5 |
| 2,300,572 | 11/42 | Hoyer et al. | 260—314.5 |
| 2,759,950 | 4/56 | Tartter | 260—314.5 |
| 3,042,475 | 7/62 | Heslop et al. | 260—314.5 |

FOREIGN PATENTS 520,199  4/40  Great Britain.

OTHER REFERENCES

Groggins: Unit Processes in Org. Synthesis, McGraw-Hill Co., New York (1947), pages 672 and 673.

IRVING MARCUS, *Primary Examiner.*

NICHOLAS S. RIZZO, WALTER A. MODANCE,
*Examiners.*

UNITED STATES PATENT OFFICE
CERTIFICATE OF CORRECTION

Patent No. 3,185,701                                                  May 25, 1965

Marco Tessandori et al.

It is hereby certified that error appears in the above numbered patent requiring correction and that the said Letters Patent should read as corrected below.

Column 1, line 58, for "Xis" read -- X is --; same line 58, for "hydrogen radical" read -- hydrocarbon radical --.

Signed and sealed this 26th day of October 1965.

(SEAL)
Attest:

ERNEST W. SWIDER                                         EDWARD J. BRENNER
Attesting Officer                                              Commissioner of Patents